United States Patent [19]

Pullman et al.

[11] 3,956,471

[45] May 11, 1976

[54] PROCESS OF MAKING CALCIUM HYPOCHLORITE

[75] Inventors: Brian James Pullman, Mitcham; William Denny Mant, Balwyn, both of Australia; Gordon Leigh Ross, Otterburn Park, Canada

[73] Assignees: ICI Australia Limited, Melbourne, Australia; Canadian Industries, Ltd., Montreal, Canada

[22] Filed: July 1, 1974

[21] Appl. No.: 484,932

[30] Foreign Application Priority Data

July 13, 1973 Austria .............................. 4090/73

[52] U.S. Cl. ................................................ 423/474
[51] Int. Cl.² ......................................... C01B 11/06
[58] Field of Search .............. 252/187 H; 423/473, 423/474

[56] References Cited
UNITED STATES PATENTS

| | | | |
|---|---|---|---|
| 1,937,230 | 11/1933 | Kitchen | 423/474 |
| 2,320,635 | 6/1943 | Mericola et al. | 423/474 |
| 2,587,845 | 3/1952 | Heller et al. | 423/474 |
| 2,965,443 | 12/1960 | Osborne et al. | 423/474 |
| 3,030,177 | 4/1962 | Mohan | 423/474 X |
| 3,051,631 | 8/1962 | Harbin et al. | 423/473 X |
| 3,134,641 | 5/1964 | Gleichert | 252/187 H X |
| 3,199,949 | 8/1965 | Clerbois et al. | 423/473 |
| 3,251,647 | 5/1966 | Nicolaiser | 423/474 |
| 3,767,775 | 10/1973 | Tatara et al. | 252/187 H X |

Primary Examiner—Benjamin R. Padgett
Assistant Examiner—David Leland
Attorney, Agent, or Firm—Cushman, Darby & Cushman

[57] ABSTRACT

In the known process of preparing a slurry of calcium hypochlorite by reaction of chlorine with a slurry of calcium hydroxide and sodium hydroxide, we provide the improvement consisting of continuously pumping into a first stirred reactor an aqueous slurry of calcium hydroxide and sodium hydroxide optionally partially chlorinated and simultaneously passing chlorine gas into the reaction mixture at such a rate that the redox potential is in the range from 650–850 mV and allowing the contents of the first reactor to overflow continuously into a second stirred reactor and simultaneously passing chlorine gas into the second reactor at such a rate that the redox potential is in the range from 750–950 mV and allowing the contents of the second reactor to overflow and be removed as product; the temperature of the contents of the first and second reactor are independently maintained at a temperature in the range 15° to 35°C.

7 Claims, No Drawings

PROCESS OF MAKING CALCIUM HYPOCHLORITE

This invention relates to improvements in the manufacture of calcium hypochlorite.

Calcium hypochlorite is widely used for water treatment and in other sanitizing applications and for this purpose the material may contain minor amounts of impurities such as calcium chloride and sodium chloride. For commercial acceptance calcium hypochlorite should contain at least 70% available chlorine, less than 2% water and have a certain particle size distribution. One process which can be used to manufacture a product meeting this specification is the interreaction of calcium hydroxide, caustic soda and chlorine according to the following equation:

$$3\ Ca(OH)_2 + 2\ NaOH + 4\ Cl_2 \rightarrow 2\ Ca(OCl)_2 + 2\ NaCl + CaCl_2 + 4H_2O$$

The process is carried out batchwise by passing chlorine gas into a slurry of the lime and caustic soda in water. When the reaction is complete the product is separated from the mother liquor and dried.

Typically the known reaction may be carried out in the following way: 234 gms of high grade lime (in this case 95.5% $Ca(OH)_2$) and 80 gms of sodium hydroxide are mixed with 690 gms of water. Conveniently the sodium hydroxide may be supplied as a concentrated solution as normally obtained from caustic soda-chlorine manufacturing operations. In any case the sodium hydroxide should be dissolved in the water prior to chlorination. Chlorine is passed into the agitated sodium hydroxide/calcium hydroxide slurry at 10 gm/min until 266 gm $Cl_2$ have been added while the temperature is maintained in the range 5°–40°C but preferably at as high a temperature in the range as possible to minimize the demand on cooling which must necessarily be applied in order that the temperature be maintained below a point when decomposition occurs.

The calcium hypochlorite is now recovered and separated from the mother liquor in the batch by any suitable conventional solids-liquid separation technique, such as filtration, centrifugation, classification, etc. It is appropriate to effect this separation only to the degree necessary for an adequate available chlorine content to exist in the wet cake such that the final specification be achieved after drying. The final stages of the process are drying and "forming" of the product to meet the needs of particular consumers. Various alternatives are well-known and include spray drying, vacuum drying, tray drying, etc. and "forming," if desired, can be achieved by compaction or granulation, etc.

We have now found that the batch process may be modified for continuous operation.

Accordingly in the known process of preparing a slurry of calcium hypochlorite by reaction of chlorine with a slurry of calcium hydroxide and sodium hydroxide, we provide the improvement consisting of continuously pumping into a first stirred reactor an aqueous slurry of calcium hydroxide and sodium hydroxide optionally partially chlorinated and simultaneously passing chlorine gas into the reaction mixture at such a rate that the redox potential is in the range from 650–850 mV and allowing the contents of the first reactor to overflow continuously into a second stirred reactor and simultaneously passing chlorine gas into the second reactor at such a rate that the redox potential is in the range from 650–950 mV and allowing the contents of the second reactor to overflow and be removed as product; the temperature of the contents of the first and second reactor are independently maintained at a temperature in the range 15° to 35°C.

The rates of addition of the reagents are not narrowly critical. The temperature of the reaction may be partially controlled by the rate of addition of the reactants. The reactants may be cooled by any convenient method.

Preferably the temperature is controlled at least partially by evaporative cooling. In a preferred embodiment of our invention the reactors are maintained under reduced pressure.

Evaporative cooling is less expensive in terms of capital and operating cost than the more conventional refrigeration techniques and for this particular application is particularly attractive since it permits elimination of large quantities of the exotic materials of construction, such as titanium, whose use is essential if extensive corrosion is to be avoided and adequate heat exchange rates maintained.

The product from our process comprises an aqueous slurry of calcium hypochlorite and the calcium hypochlorite may be separated from the mother liquor and dried by any convenient method known in the art. The product may be removed by overflow or pumping.

The rates of addition of the reagents are adjusted so that the molar ratio of calcium hydroxide to caustic soda to chlorine is approximately that required by the equation given hereinabove i.e. 3:2:4.

The amount of water used to slurry the calcium hydroxide and caustic soda is not narrowly critical. In general sufficient water should be added to produce a reaction mixture which is stirrable and pumpable. The weight ratio of calcium hydroxide to water is normally in the range from 1:4 to 1:2 when conventional refrigeration is used. However since the ratio of water to the individual reactants used in the process is important in determining the mobility of the reaction mixture and the final yield of product and since water is being removed from the process by the evaporative cooling method used for maintaining the reaction temperature below the level at which significant decomposition occurs, allowance for this water must be made in formulating the reactant charge.

Accordingly we prefer that for the process of our invention using evaporative cooling that the weight ratio of calcium hydroxide to water is in the range from 1:6 to 1:3.

The advantages of the process of our invention are firstly improved control of viscosity of the reaction mixtures and secondly, improved control of temperature. In a batch process as the reaction proceeds the reaction mixture changes markedly in viscosity and the amount of heat of reaction evolved also chenges between wide limits. In the continuous process of our invention the viscosity of the reaction mixture and the heat evolved by the reaction only changes over very narrow limits, and this leads to substantial economies.

The invention is illustrated by, but by no means limited to the following example.

EXAMPLE 1

Two 1650 ml reactors were placed in series so that the contents of the first overflowed to the second, and the contents of the second overflowed to a centrifuge.

An aqueous feed slurry containing 23.0 wt % calcium hydroxide and 7.9 wt % sodium hydroxide was pumped continuously into the first reactor at 32.4 ml/min.

The temperature in each reaction was maintained at 20°C by cooling and chlorine was fed continuously to each so as to maintain a constant mV (Pt/Ag) reading of 740 mV in the first reactor and 790 mV in the second reactor.

When the conditions in both reactors had stabilized the total input and output over about 12 minutes was measured. The results are shown in Table 1.

TABLE 1.

Wt. of slurry fed to first reactor = 546 gm
Wt. of chlorine fed to first reactor = 108 gm
Wt. of chlorine fed to second reactor = 36 gm
Wt. filter cake recovered (40% AvCl 49% $H_2O$) = 269 gm
    (i.e. 108 gm $Cl_2$)
Wt. filtrate recovered (8% Av Cl) = 437 gm
    (i.e. 35 gm $Cl_2$)

The viscosity as measured on a spinning disc viscometer was 325–380 cp in the first reactor and 870–1000 cp in the second reactor.

The experiment was repeated as a batch process using the same proportions of raw materials. The viscosity of the mixture reached a maximum of about 12,000 cp.

We claim:

1. A process for the continuous preparation of a calcium hypochlorite slurry which comprises:
    a. continuously pumping into a first stirred reactor an aqueous slurry of calcium hydroxide and sodium hydroxide while simultaneously passing chlorine gas into the reaction mixture at such a rate that the redox potential is in the range from 650 – 850 mV;
    b. allowing the contents of said first reactor to overflow continuously into a second stirred reactor;
    c. simultaneously passing chlorine gas into said second stirred reactor at such a rate that the redox potential is in the range from 650 – 950 mV;
    d. allowing the contents of said second stirred reactor to overflow; and
    e. removing the overflow from said second stirred reactor, while independently maintaining the temperature of the contents of said first and second stirred reactor in the range from 15° to 35°C.

2. A process according to claim 1 wherein said aqueous slurry contains calcium hydroxide and sodium hydroxide partially chlorinated.

3. A process according to claim 1 wherein the redox potential in said first and second reactor is maintained at a constant mV.

4. A process according to claim 1 wherein the temperature is controlled at least partially by evaporative cooling.

5. A process according to claim 1 wherein the reactors are maintained under reduced pressure.

6. A process according to claim 1 wherein the rates of addition of the reagents are adjusted so that the molar ratio of calcium hydroxide to caustic soda to chlorine is approximately 3 : 2 : 4.

7. A process according to any one of claim 1 inclusive using evaporative cooling and wherein the weight ratio of calcium hydroxide to water is in the range from 1 : 6 to 1 : 3.

* * * * *